United States Patent [19]

Bourque

[11] 4,037,758
[45] July 26, 1977

[54] MOLD FILLING SYSTEM
[75] Inventor: René Bourque, Laval, Canada
[73] Assignee: Garcia Corporation, Teaneck, N.J.
[21] Appl. No.: 583,568
[22] Filed: June 4, 1975
[51] Int. Cl.² .......................................... B67D 5/56
[52] U.S. Cl. ................................. 222/134; 222/145; 222/318; 259/4 R
[58] Field of Search ............... 239/104, 166, 169, 170, 239/280.5, 281; 222/145, 318, 134, 135; 141/107; 259/4 R

[56] References Cited
U.S. PATENT DOCUMENTS

| | | | |
|---|---|---|---|
| 1,442,405 | 1/1923 | Hawthorne | 141/107 |
| 2,784,948 | 3/1957 | Pahl et al. | 259/4 R |
| 3,097,764 | 7/1963 | Loeser | 222/134 X |
| 3,306,495 | 2/1967 | Wabers | 222/318 X |
| 3,705,710 | 12/1972 | Mueller | 222/145 |
| 3,876,114 | 4/1975 | Hicks et al. | 222/145 |
| 3,926,345 | 12/1975 | Pulk et al. | 222/145 |
| 3,964,731 | 6/1976 | Ernst | 222/318 X |

Primary Examiner—Robert B. Reeves
Assistant Examiner—Hadd Lane
Attorney, Agent, or Firm—Fitzpatrick, Cella, Harper & Scinto

[57] ABSTRACT

A system is described wherein components such as a prepolymer and a curative are delivered by means of positive displacement pumps through a special valve at the upper end of a static mixing tube. The components pass down the tube while being intermixed to form a reaction mixture which is dispensed into a mold by means of a valve at the lower end of the tube. The special valve forms part of a recirculation system which permits bypass and recirculation of each component between dispensing operations so that the pump can continue to operate at constant velocity. The static mixing tube is pivotally suspended from an arm so that its lower end may be properly positioned with respect to a mold to be filled. Special end interlocked mixing vanes are provided in the static mixing tube for convenient disassembly.

25 Claims, 12 Drawing Figures

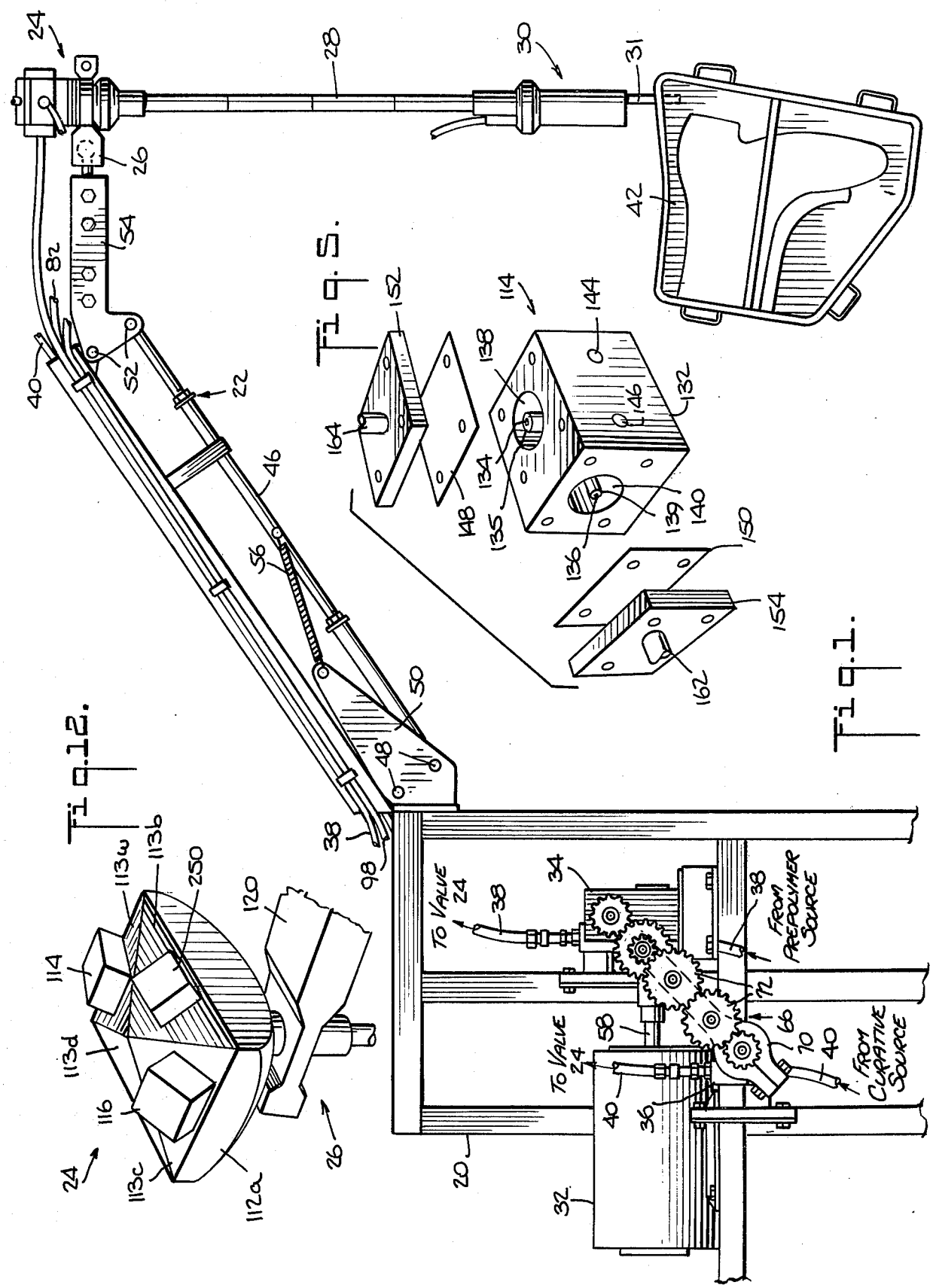

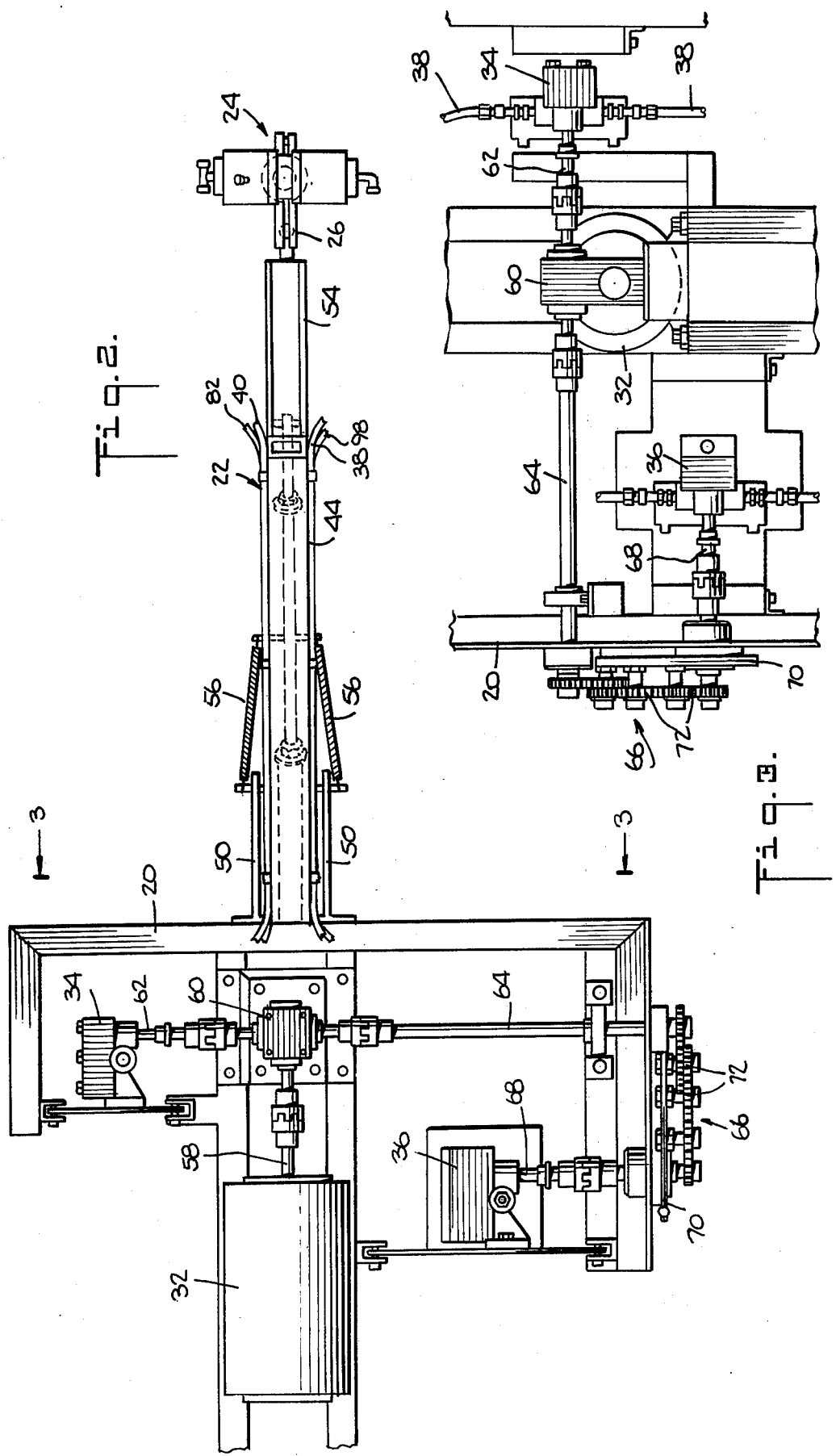

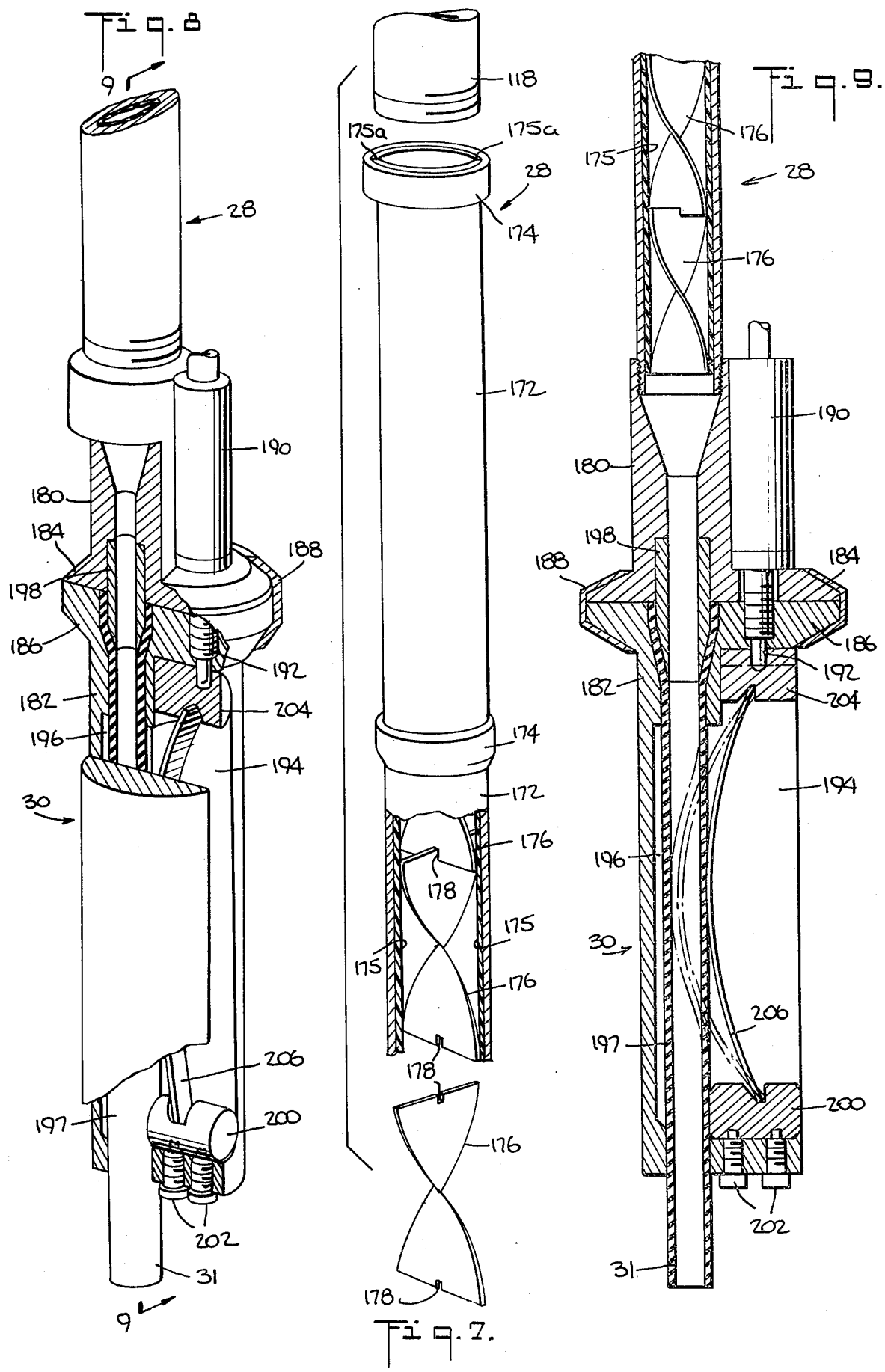

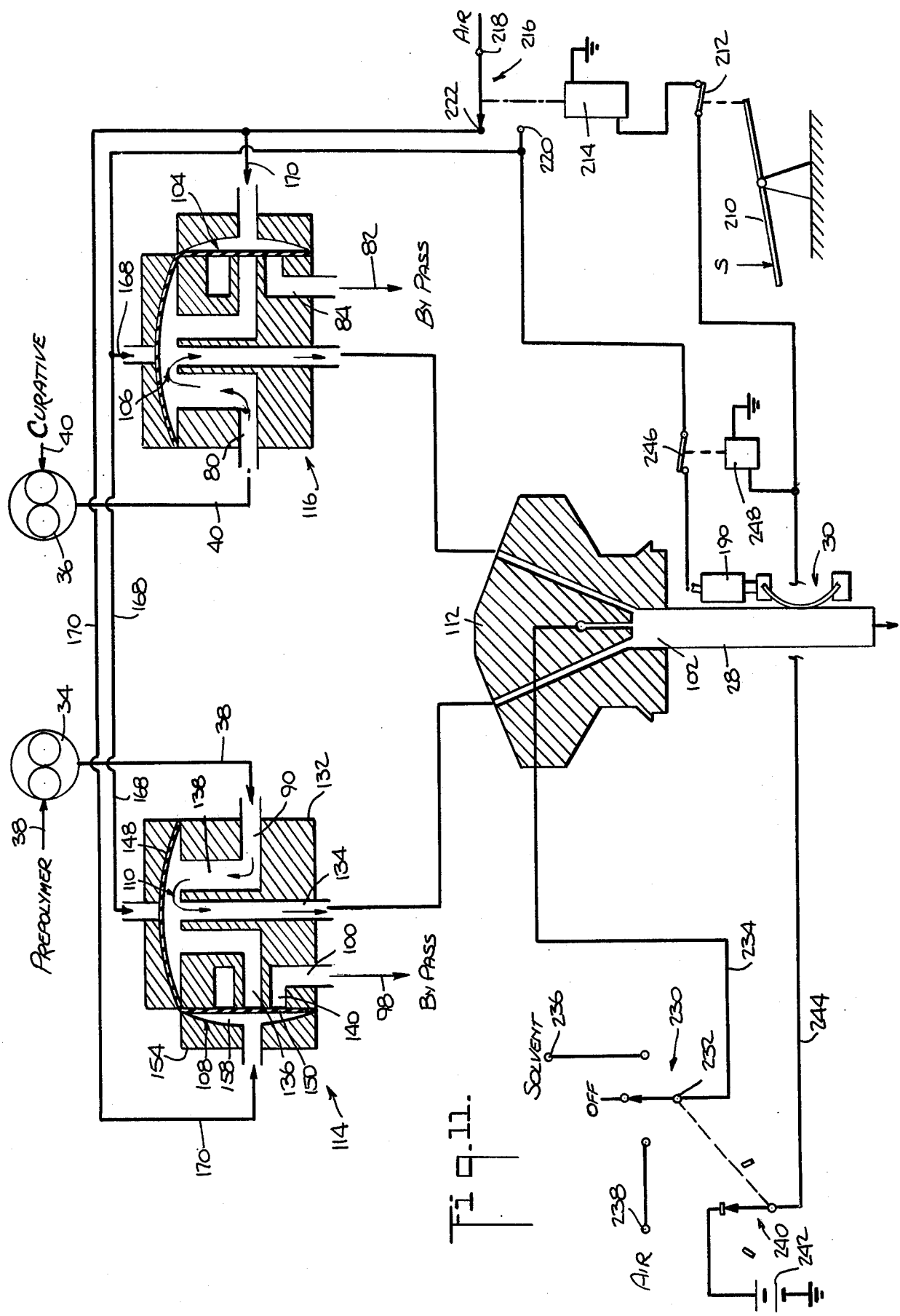

MOLD FILLING SYSTEM

BACKGROUND OF THE INVENTION

1. Field of the Invention

This invention relates to fluid handling systems and more particularly it concerns novel arrangements for delivering a reactive mixture, such as a multiple component thermosetting polymer, to molds for the casting of various objects. The invention is particularly well suited for the manufacture of plastic footwear such as skate and ski boots.

2. Description of the Prior Art

Plastic boots have previously been manufactured by injecting or pouring a reactive mixture of a synthetic rubber prepolymer, such as that sold under the trademark Adiprene, and a curing agent such as that sold under the trademark Moca, into molds and allowing polymerization to take place within the molds. In general synthetic rubber prepolymers and their curative were separately prepared in batch type systems and then were mixed together immediately prior to injection into the molds. Prior to mixing, however, the prepolymer must first be preheated to and maintained at a temperature of about 190° F (88° C). The heated prepolymer must then be subjected to a vacuum degassing operation. The catalyst also must be preheated to a temperature of about 235° F (113° C) to bring it to a liquid state. The thus heated prepolymer and curative are then separately pumped into a common mixing device were they are throughly intermixed just before injection into a mold. It is important in the mixing operation to maintain a proper volume ratio of the prepolymer and curative. The volume ratio of these components is controlled by separately pumping each component at a predetermined rate into the mixing device.

Because of the nature of many synthetic rubber prepolymers and many curing agents, in both their unmixed and mixed condition, a number of precautions must be observed in handling them. One of the most important of these precautions is that the ratio of the prepolymer and the curative be very closely controlled. If the amount of curative is too low, the prepolymer will not have proper physical properties, and an imperfect product will result. On the other hand, if the amount of the curative is too high, the excess curative will escape into the atmosphere and may present a health hazard to workers in the area.

In the past, it was difficult to maintain a precisely controlled volume ratio of the prepolymer and curative reaction components. This was because the pumps, which controlled the volume flow rates of the prepolymer and curative to a mixing device, became subjected to substantial back pressures at the end of each mold filling operation. When the flow of mixture into the mold was completed, the pumps either had to be stopped or they had to operate under conditions of high slippage. In either case, the volume delivery rate of the pumps tended to drift from their original setting and the volume ratio of the reaction mixture components correspondingly shifted.

Another difficulty experienced in connection with the use of a prepolymer and curative reaction mixture was that the mixture tended to polymerize and solidify, to a certain extent, in the mixing device and in the conduit and valve means extending from the mixing device to the mold. Because of this it was necessary periodically to clean the mixing device and conduit with a solvent. This in turn required that the overall system be stopped until the mixing device and conduit could be disassembled, cleaned and reassembled. In the past, this disassembly and cleaning was very time consuming and tedious. Furthermore, whenever the system was stopped, it became necessary thereafter to recalibrate the pumps which supplied the reaction mixture components to the mixing device.

The mixing devices of prior art mold filling systems were complex and bulky and they had to be provided with a motor or other mechanical drive to turn a stirring element. Because of this the mixing device had to be rigidly mounted and the mold had to be positioned relative to the outlet of the mixing device in order to be fitted. This required considerable effort on the part of the operator and led to operator fatigue. Static mixers were known in the prior art as evidenced by U.S. Pat. Nos. 3,286,992 and 3,664,638. However, these mixers were not used with mold filling systems. Moreover, they did not lend themselves to rapid disassembly for cleaning purposes.

SUMMARY OF THE INVENTION

The present invention overcomes the above described difficulties of the prior art and provides novel arrangements which permit safe and efficient filling of molds with a thermosetting reactive mixture. With the present invention, reactive mixture components, such as a prepolymer and a curative, are supplied to a mixing device at a very precise volume ratio. Moreover, the flow of component material and the pumping back pressure are not affected either between successive mold filling operations or during cleaning of the mixing device.

According to one aspect of the invention there is provided a novel mixing and dispensing apparatus for a multiple component reactive mixture. This novel apparatus includes a mixing valve having a common outlet which leads to a mixing device and separate inlets and outlets for each of the different components. Separate, positive displacement pumps are arranged to deliver each of the components from respective reservoirs to a corresponding one of the separate valve inlets; and means are provided for driving the pumps in synchronism at a speed ratio such that a predetermined component ratio is supplied to the valve. The separate valve outlets are connected via associated bypass lines back to the component reservoirs. Means are also provided to operate the mixing valve. When the valve is switched to one condition each separate inlet communicates with the common outlet while each separate outlet is blocked so that the components become pumped into the mixing device. When the valve is switched to a second condition each separate inlet communicates with its associated outlet so that the components are pumped continuously through the valve and back out through the bypass lines to their reservoirs instead of coming together in the mixer. This allows the positive displacement pumps to operate continuously and in synchronism without being subjected to back pressure variations or other conditions which affect the volume ratio of the components delivered to the mixing device.

According to a further aspect of the present invention there is provided a novel fluid flow control valve of simple construction which can be radily disassembled for cleaning or repair and which can be arranged in conjunction with other similar valves in a common valve block to perform relatively complex flow control functions. This novel valve structure, moreover, is readily controlled by application of air or other pilot fluid pressure to fully accessible control ports. This novel fluid flow control valve comprises a block of solid material formed with a pair of adjacent passageways, which open out onto a common outer surface of the block. These passageways are separated by a separating wall whose outer end is substantially even with the surrounding outer surface of the block. A flexible diaphragm is sealed to the block around the passageways but is free to move against and to bulge out away from the separating wall in response to pressure differentials across it thereby to control communication between the passageways. The adjacent passageways communicate respectively with different fluid ports leading to and from the block. Means are provided for applying pilot fluid pressure to the side of the diaphragm facing away from the passageways. When high pressure is applied to the diaphragm it presses tightly against the separating wall and seals the two passageways from each other to prevent fluid flow between them. When pilot fluid pressure is released the diaphragm may bulge out from the separating wall and allow communication between the passageways. Several sets of such passageways may be provided at different locations on the block with associated, separately controlled diaphragms and various internal passageways may also be provided to achieve different flow control functions.

According to another aspect of the present invention there is provided a novel mechanism for filling molds with a reaction mixture which polymerizes in the mold. This mechanism comprises a supporting framework with an arm extending out from the framework and a mixing device pivotally suspended from the outer end of the arm. Reaction component conduits extend out along the arm and are connected to the mixing device near the pivot. A dispensing valve is provided at the outlet of the mixing device and a dispensing nozzle extends from the dispensing valve. By mounting the mixing device to pivot from the arm, the nozzle may easily be positioned at the inlet of the molds to be filled without having to shift the molds themselves to any substantial extent.

In another of its aspects, the present invention relates to a novel static mixing device comprising a cylindrical tubular member and a plurality of static mixing vanes extending in axial alignment along the interior of the cylindrical member. Each of the vanes comprises a sheet-like element extending lengthwise along the length of the cylindrical member and twisted along the axis of the cylindrical member. The elements are formed with slots extending into their ends and they are interfitted to each other at those slots. This provides for a rigid assembly of the vanes and yet it allows them to be disassembled readily for cleaning and repair.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be uitilzed as a basis for the designing of other structures or methods for carrying out the several purposes of the invention. It is important, therefore, that the claims be regarded as including such equivalent constructions and methods as do not depart from the spirit and scope of the invention.

BRIEF DESCRIPTION OF THE DRAWINGS

Certain specific embodiments of the invention have been chosen for purposes of illustration and description, and are shown in the accompaying drawings, forming a part of the specification wherein:

FIG. 1 is a side elevational view of a reaction component mixing and mold filling apparatus in which the present invention is embodied;

FIG. 2 is a top plan view of the mixing and mold filling apparatus of FIG. 1;

FIG. 3 is a fragmentary view taken along line 3—3 of FIG. 2;

FIG. 5 is an enlarged perspective view, partially cut away, of a valve head assembly forming one portion of the apparatus of FIG. 1;

FIG. 6 is an exploded view of a valve subassembly forming a part of the valve head assembly of FIG. 5;

FIG. 7 is a perspective view, partially exploded and partially cut away, of a static mixer forming another portion of the apparatus of FIG. 1;

FIG. 8 is a perspective view, partially cut away, of a dispensing valve assembly forming a still further portion of the apparatus of FIG. 1;

FIG. 11 is a schematic diagram similar to FIG. 10 but showing the system in a dispensing condition; and FIG. 12 is a perspective view of a modified form of valve head assembly useable in the apparatus of FIG. 1.

DETAILED DESCRIPTION OF THE PREFERRED EMBODIMENTS

Figure 4:
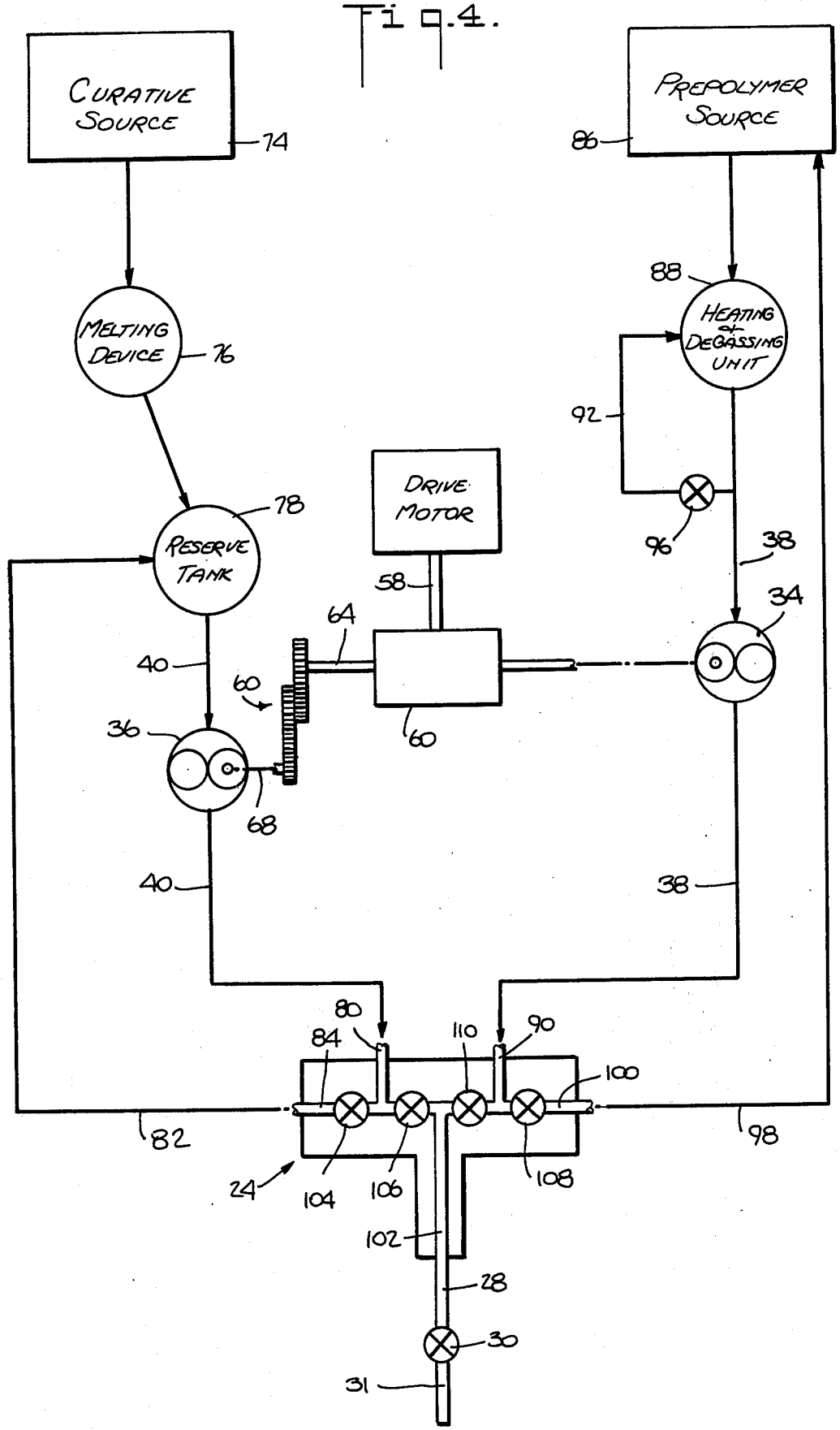
FIG. 4 is a diagrammatic representation of the flow paths of components mixed and dispensed by the apparatus of FIG. 1.

The component mixing and mold filling apparatus of FIG. 1 comprises a framework-like base 20 from which an arm 22 extends in cantilever fashion. A valve head assembly 24 is mounted by means of a ball and socket joint 26 to the outermost end of the arm 22. A static mixer 28 is connected to hang down from the valve head assembly 24 and a dispensing valve assembly 30 is mounted on the lower end of the static mixer 28. A mold filling nozzle 31 extends down from the dispensing valve assembly 30.

A motor 32 is mounted on the base 20 and is arranged, by means to be described hereinafter, to drive a prepolymer pump 34 and a curative pump 36, both of which are also mounted on the base 20. These pumps are interposed, respectively, in prepolymer and curing agent supply lines 38 and 40 which extend from prepolymer and curative reservoirs (not shown) up through the arm 22 to the valve head assembly 24. A synthetic rubber prepolymer, such as that sold under the trademark Adiprene, and a curative, such as that sold under the trademark Moca, are pumped through the supply lines 38 and 40 and are simultaneously directed through the valve head assembly 24 into the upper end of the static mixer 28. As the prepolymer and curative move downwardly through the static mixer, they become throughly mixed together to form a reactive mixer in which the prepolymer component begins to cure.

The prepolymer and curative pumps 34 and 36 are both of the positive displacement type, preferably, gear pumps. Positive displacement pumps operate essentially independently of the upstream and downstream pressure; and instead they deliver fluids at volumetric flow rates corresponding to the speeds at which the pumps are driven. Thus, by driving the positive displacement pumps 34 and 36 at a selected speed ratio a corresponding volume flow rate ratio of the prepolymer and curative can be obtained.

A mold 42 into which the reactive mixture is dispensed or injected is supported in any convenient manner near the lower end of the static mixer 28. Because the static mixer and the valve head assembly 24 are mounted by means of the ball and socket joint 26, the lower end of the static mixer and the dispensing nozzle and valve assembly 30 are free to be moved over a considerable distance. This allows the mold 42 to be filled while it is moving along on a conveyor, without undue effort on the part of the operator.

As can be seen in FIGS. 1 and 2, the arm 22 comprises a main arm member 44 of box section configuration and a rod-like tensioner member 46 which extends parallel to and below the main arm member. The prepolymer and curative supply lines 38 and 40 extend alongside of the main arm member 44. Both the main arm member 44 and the tensioner member 46 are connected at their lower ends to spaced apart pivots 48 on lower brackets 50 fixed to the base 20. The upper ends of the main arm member and the tensioner member are likewise connected to spaced part pivots 52 on a male universal attachment 54 which extends horizontally out from the outer end of the arm 22 and forms one part of the ball and socket joint 26. It will be noted that the arm member 44, the rodlike tension member 46, the lower brackets 50, and the universal attachment 54 cooperate to form a parallelogram by which the outer end of the arm may move up and down while the male universal attachment continues to extend horizontally. Tensioner springs 56 are provided to extend from the lower brackets 50 to locations approximately midway along the length of the tension member 46. These springs serve to bias the arm 22 to the position shown; yet they allow the arm to be pulled downwardly to place the mold filling nozzle 31 in the mold 42.

As can be seen in FIGS. 2 and 3, the motor 32 has a drive shaft 58 connected to the input of a gear reducer 60 mounted on the base 20. The gear reducer 60 is provided with first and second output shafts 62 and 64 which turn at the same speed but more slowly than the motor drive shaft 58. The first output shaft 62 is directly coupled to the prepolymer pump 34. The second output shaft 64, however, is connected thorugh a gear set 66 and a third shaft 68 to the curative pump 36. The gear set 66 serves to reduce the speed of the third shaft 68 so that the catalyst pump 36 is driven in synchronism with but at a speed reduced from that of the prepolymer pump 34. The ratio of the pump speeds is precisely established and maintained by the gear set 66.

The gear set 66, as can be seen in FIGS. 1, 2 and 3, comprises a bracket holder 70 which extends between the second and third shafts 64 and 68 and which carries a plurality of interchangeable meshed gears 72. By interposing different sized gears 72 between the shafts 64 and 68, the speed ratio between the two shafts may be changed.

The prepolymer and catalyst pumps 34 and 36 are of the positive displacement type, such as gear pumps, so that the volumetric delivery of these pumps corresponds precisely to their respective speeds.

The diagram of FIG. 4 shows the various flow paths for the prepolymer and curative in the apparatus of the present invention. As shown in FIG. 4 there is provided a curative source 74. The particular curative employed depends upon the prepolymer material to be cured. Thus where the prepolymer material is a polyurethane rubber such as that sold under the trademark Adiprene, a curative such as 4,4'methylenebis (2-chloroaniline), sold under the trademark Moca, is preferred, although other curatives may be used. The curative Moca is a solid at room temperature and therefore it is supplied to a curative melting device 76 which brings it up to a temperature of about 235° F (112° C). The now liquid curative is then transferred to a curative reserve tank 78 which maintains it in its heated condition. The curative supply line 40 extends from the curative reserve tank 78 and through the catalyst pump 36 to a curative input port 80 in the valve head assembly 24. A curative bypass line 82 extends from a curative bypass port 84 in the valve head assembly 24 back to the catalyst reserve tank 78. The tank 78 is maintained at a pressure of about 20 psig, using nitrogen gas; and this provides a constant pressure at the input side of the pump 36.

There is also provided a prepolymer source 86. In the illustrative embodiment the particular prepolymer used is a polyurethane rubber such as that sold under the trademark Adiprene. The prepolymer is supplied to a heating and degassing unit 88 which brings it to a temperature of about 190° F (87° C). The prepolymer supply line 38 extends from the heating and degassing unit 88 and through the prepolymer pump 34 to a prepolymer input port 90 in the valve head assembly 24. In order to prevent excessive back pressure at the pump input there is provided a feedback loop 92 from the output of the heating and degassing unit 88 back to a feedback inlet 94. A relief valve 96 is interposed in the feedback loop 92 to maintain control of input pressure to the pump 34 corresponding the input pressure of the curative. A prepolymer bypass line 98 extends from a prepolymer bypass port 100 in the valve head assembly 24 back to the prepolymer source 86. In the preferred embodiment, each of the catalyst supply and bypass lines and prepolymer supply and bypass lines are provided with suitable electrical resistance heating means and insulation (not shown) to maintain the reactive materials at their proper temperature.

As shown diagrammatically in FIG. 4, the valve head assembly 24 is provided with a common output port 102 which opens to the static mixer 28. The valve head assembly also includes a curative bypass valve 104 interposed between the curative input port 80 and the curative bypass port 84 and a curative feed valve 106 interposed between the catalyst input port 80 and the common output port 102. The valve head assembly further includes a prepolymer bypass valve 108 interposed between the prepolymer input port 90 and the prepolymer bypass port 100 and a prepolymer feed valve 110 interposed between the prepolymer input port 90 and the common output port 102.

During operation of the system the drive motor 32 operates through the gear reducer 60 the output shafts 62 and 64, the gear set 66 and the third shaft 68 to drive the positive displacement prepolymer and curative pumps 34 and 36 continuously at precisely synchronized speeds so that a predetermined ratio of prepolymer and catalyst is supplied to the valve head assembly 24 via the prepolymer and catalyst supply lines 38 and 40. When a mold is to be filled, the dispensing valve 30 and the curative and prepolymer feed valves 106 and 110 are opened while the catalyst and prepolymer bypass valves 104 and 108 are closed. This permits the curative and prepolymer to be pumped through the valve assembly 24 and through the common output port 102 and through the static mixer 28. The catalyst and prepolymer become mixed in the static mixer to form a reaction mixture which passes through the dispensing valve assembly 30 and out through the mold injection nozzle 31.

When a mold is filled and it is desired to discontinue flow of reactive mixture into the molds, the dispensing valve 30 and the curative and prepolymer feed valves 106 and 110 are closed and the curative and prepolymer bypass valves 104 and 108 are opened. This terminates flow of reactive mixture out through the nozzle 31 and at the same time it allows the prepolymer and curative to continue flowing back through their respective bypass lines 98 and 82. No back pressure is imposed on the pumps 34 and 36 and no change in the volumetric delivery ratio of the pumps is experienced.

The construction of the valve head assembly 24 is best seen in FIGS. 5 and 6. As shown in FIG. 5 the valve head assembly 24 includes a manifold 112 formed of a block of aluminum or equivalent material. The upper region of the manifold 112 is formed with slightly inclined flat surfaces on which are mounted prepolymer and curative valve subassemblies 114 and 116. The lower region of the manifold 112 is formed with a hollow neck 118 which is gripped by a female universal attachment 120. This female universal attachment also forms one part of the ball and socket joint 26. The hollow neck 118 has formed therein the common output port 102 discussed above in connection with FIG. 4. An upper marman clamp 122 holds the upper end of the static mixer to the neck 118 of the valve manifold 112. As shown in dotted outline, a prepolymer feed passage 124 extends through the manifold 112 from the prepolymer valve subassembly 114 to the interior of the hollow neck 118. Similarly, a curative feed passage 126 extends through the manifold 112 from the curative valve subassembly 116 to the interior of the hollow neck 118. A solvent feed passage 128 also extends from a solvent inlet fitting 130 on one side of the manifold to the interior of the hollow neck 118. A check valve (not shown) is provided in the solvent inlet fitting 130 to prevent blowback from the neck 118 out through the solvent inlet.

The prepolymer and curative valve subassemblies 114 and 116 are of substantially identical construction so that only the prepolymer valve subassembly 114 will be described in detail. As can be seen in FIGS. 5 and 6 this subassembly includes a generally cube shaped body portion 132 of aluminum or equivalent rigid material. First and second inner bores 134 and 136 are drilled into different sides of the body portion along with coaxially arranged counterbores 138 and 140. These bores and counterbores form passageways which open out onto the surface of the body portion 132. These passageways in turn are separated by annular walls 135 and 139. The counterbores 138 and 140 extend only a short way into the body portion 132; however, as shown in FIG. 5 the first inner bore 134 extends completely through the body portion and through a clamping plate 142 to the prepolymer feed passage 124. The second inner bore 136 extends into lateral communication with the first counterbore 138. As shown in dotted outline in FIG. 5 there are also provided passages which constitute the prepolymer inlet and bypass ports 90 and 100 and which extend from a third side of the body portion to the first and second counterbores 138 and 140, respectively. Similar bores, counterbores and passageways are provided in the curative valve subassembly 116. As shown on the subassembly 116, quick disconnect fittings 147 are provided on the third side of the curative valve subassembly 116 to permit the curative supply and bypass lines 40 and 82 to be easily connected and disconnected to the valve head. Similar fittings are, of course, provided on the prepolymer valve subassembly 114.

As can be seen in the exploded view of FIG. 6, diaphragms 148 and 150 of elastic material such as rubber or a polymeric substance unaffected by the prepolymer and curative extends over each of the surfaces of the body portion 132 into which the bores and counterbores 134, 136, 138 and 140 are formed. An inlet valve cap 152 and a bypass valve cap 154 cover each of the diaphragms 148 and 150 respectively. The diaphragms are thus sealed to the surface of the body portion around the outer bores 138 and 140. They also press against but are not sealed to the tops of the walls 135 and 139 which are substantially even with the outer surface of the body portion. As can be seen in FIG. 5 the valve caps 152 and 154 are formed with concavities 156 and 158, respectively, on the sides thereof facing the diaphragms 148 and 150. Single ended air fittings 160 and 162 are provided on the outer surface of each of the valve caps 152 and 154 and these air fittings communicate with the concavities 156 and 158.

It will be noted that corresponding double ended air fittings 164 and 166 are provided at corresponding locations on the catalyst valve subassembly. Feed and bypass control air lines, represented by broken lines 168 and 170, are connected, respectively, through each of the double ended fittings 164 and 166 to corresponding ones of the single ended fittings 160 and 162. Thus by controlling the flow of pressurized air through the lines 168 and 170, the two valve subassemblies 114 and 116 can be operated in unison.

The construction of the static mixer 28 is best seen in FIG. 7. As there shown the static mixer 28 is made up of a plurality of tubular segments 172 connected end to end by means of marman clamps 174 or the like. Each tubular segment is fitted with a tubular liner 175 made of a plastic material such as polytetrafluroethylene. The liners 175 are in the form of split tubes fitted together along diametrically opposed lines 175a. The material of the liners allows the reactive mixture to flow smoothly through the static mixer 28 and the split tube construction of the liners 175 permits convenient disassembly for cleaning or repair. A plurality of mixing vanes 176 are arranged end to end along the interior of the tubular liners 175. Each mixing vane comprises a rigid sheet-like element extending lengthwise along the length of the tubular segments. The width of each element is approximately equal to the inner diameter of the tubular segments. The elements forming the vanes 176 are each twisted along the axis of the tubular segments 172. Slots 178 are formed to extend axially into the ends of the vane 176 and the adjacent vane elements are interfitted at these slots so that one vane element cannot turn axially with respect to another. These slots are of a width sufficient to closely accomodate the thickness of the adjacent element. It will be appreciated that the vane elements are thus held rigidly in place and are held automatically from relative rotation as materials to be mixed, e.g., a prepolymer and a catalyst, pass downwardly through the device. Nevertheless the device may be quickly and completely disassembled for cleaning and repair due to the fact that the vane elements are not welded on otherwise fastened to each other or to the tubular segments.

Figure 9:
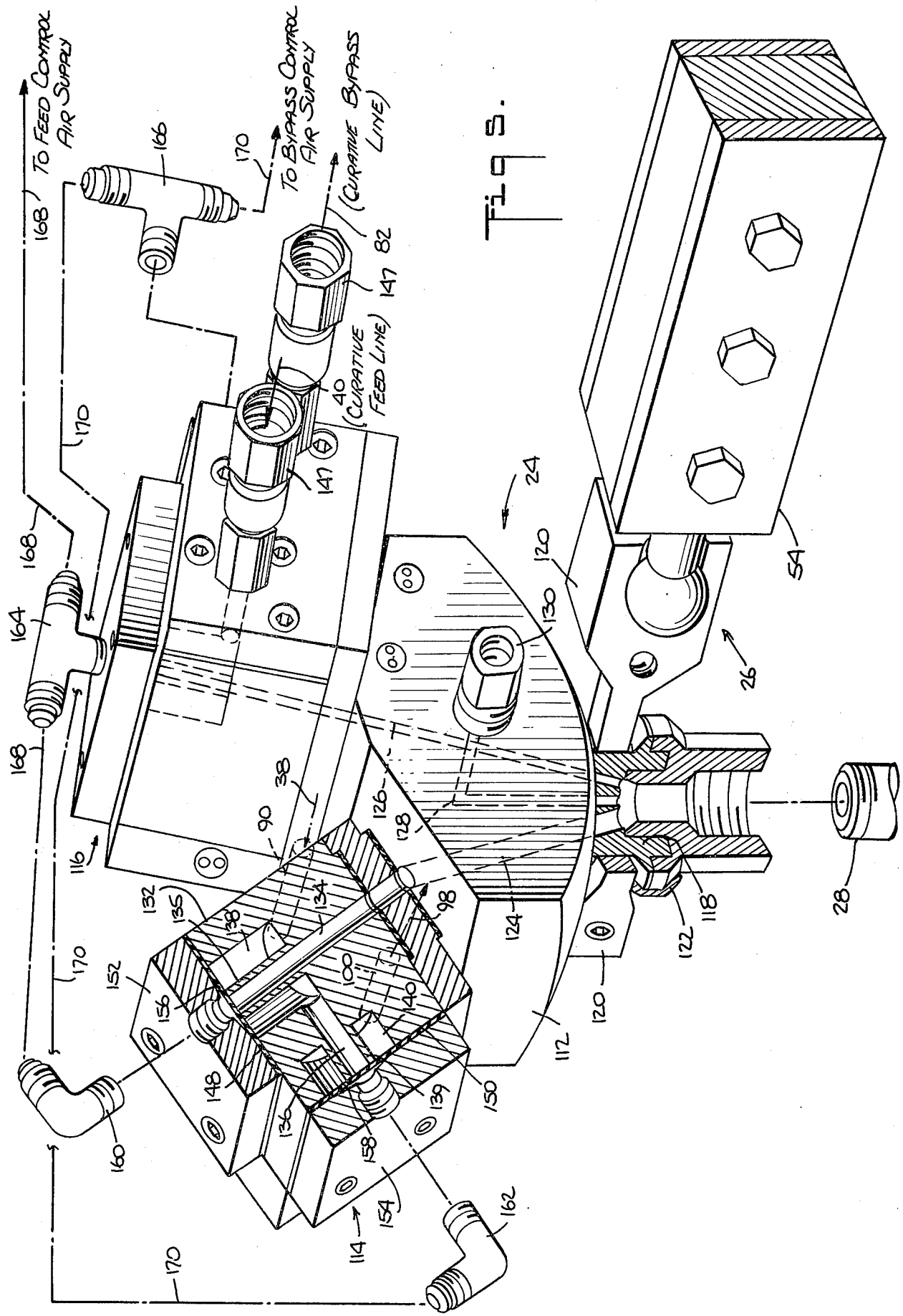
FIG. 9 is a section view, taken along lines 9—9 of FIG. 8.

FIGS. 8 and 9 show the construction of the dispensing valve assembly 30. As can be seen in FIGS. 8 and 9, the dispensing valve assembly comprises an upper body member 180 and a lower body member 182 both of generally tubular configuration and held together at mating flanges 184 and 186 by a quick disconnect clamp 188. The upper body 180 is threadedly engaged with the lower end of the static mixer 28. An air operated solenoid 190 is mounted on the upper body member flange 184, and this solenoid includes a reciprocally movable actuating element 192 which extends through the lower body member flange 186 and is movable in a direction parallel to the axis of the upper and lower body members 180 and 182. The lower body member 182 is formed with an axially extending bore 196 in communication along its length with the slot 194 and opening out through the bottom of the lower body member. The mold filling nozzle 31, as shown in FIGS. 8 and 9 is actually at the lower end of a flexible dispensing hose 197 which extends up through the bore 196 of the lower body member 182. The upper end of the dispensing hose 197 is locked into position near the upper end of the bore 196 by means of a tapered tubular clamping element 198 extending out from the bottom of the upper body member 180. The flexible dispensing hose 197 is made of a flexible plastic or rubber material which is unaffected by the reactive mixture which passes through it and which is resistant to the effects of repeated pinching.

A lower support block 200 is secured to the bottom of the slot 194 by means of screws 202; and a movable upper support block 204 is fitted to slide up and down in the slot 194 near its upper end. An elongated resilient actuator 206 is fitted between and supported by the blocks 200 and 204. The actuator 206 is of spring steel, or the like and it is bowed inwardly, as shown, toward the flexible dispensing hose 197. When the actuator support block 204 is in its uppermost position as shown in FIG. 9, the actuator 206 rests lightly against, but does not pinch the flexible dispensing hose 197. However, when the air cylinder 190 is actuated to cause its actuating element 192 to move downwardly, the actuating element causes the upper block 204 also to move downwardly to bow out the actuator 206 to its phantom line position. The actuator thus presses against the dispensing hose 197 so that it becomes pinched off and thereby presents further flow of the reactive mixture through it.

The air cylinder 190 is energized to move the upper block 204 and pinch the dispensing hose closed, as above described, by means of air pressure applied through a control air line 208.

Figure 10:
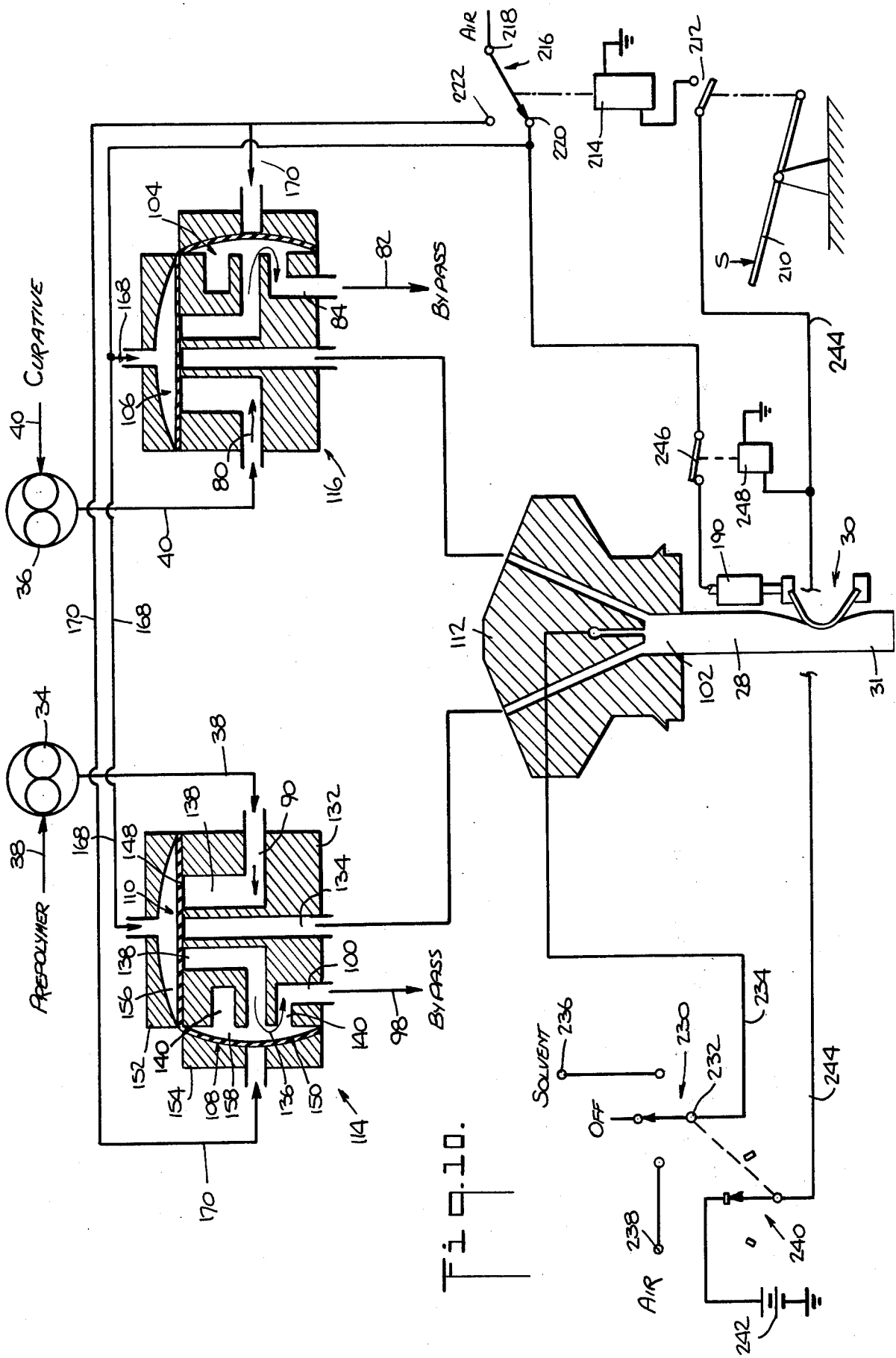
FIG. 10 is a schematic diagram of a valve control system used with the apparatus of FIG. 1 and showing the system in a mixture non-dispensing condition.

FIGS. 10 and 11 illustrate the control of the various valves in the mold filling system during mold filling operations. As can be seen in FIG. 10, there is provided a foot pedal 210 arranged conveniently near the mold filling nozzle 31, so that an operator who positions the nozzle 31 into a mold to be filled can control the filling operation by pushing down on the pedal 210 with his foot as indicated by the arrow S in FIG. 10. The pedal 210 is connected to operate a switch 212 which in turn closes and opens an electric circuit to a mold filling control solenoid 214. The solenoid 214 in turn is connected to operate an air supply control valve 216. This air supply control valve has a common air input 218 connected to a source of pressurized air (not shown), and a pair of outputs 220 and 222 connected, respectively, to the feed and bypass control air supply lines 168 and 170. As discussed above in connection with FIG. 5, the feed control air supply line 168 is connected to the inlet valve cap concavities 156 of both the prepolymer and curative valve subassemblies 114 and 116. Similarly, the bypass air control supply line is connected to the bypass valve cap concavities 158 of both the prepolymer and curative valve subassemblies 114 and 116. It will also be noted in FIGS. 10 and 11, that the diaphragm 148 cooperates with the concentric bores 134 and 138, and with the concavity 156 in the cap 152 to form the prepolymer feed valve 110. Similarly, the diaphragm 150 cooperates with the concentric bores 136 and 140, and with the concavity 158 in the cap 154 to form the prepolymer bypass valve 108. Similar concentric bore and diaphragm arrangements form the curative bypass and feed valve 104 and 106 in the curative valve subassembly 116.

During operation of the system shown in FIGS. 10 and 11, the prepolymer and curative pumps 34 and 36 operate continuously; and, as explained above, these pumps being of the positive displacement type and synchronously driven serve to provide a very closely regulated volume ratio of prepolymer and curative through the lines 38 and 40.

Prior to injection of reaction mixture into a mold, the foot pedal 210 is in its raised position as shown in FIG. 10. This allows the switch 212 to remain open so that the mold filling control solenoid 214 is deenergized and the air supply control valve remains in its unactuated condition such that it connects the common air input 218 to the first output 220 and the feed air control line 168. It will be noted the during this time the bypass air control line is disconnected from the air supply.

The application of pressurized air to the feed air control line 168 causes the diaphragm 148 in the prepolymer valve subassembly 114 to be forced tightly against the annular wall 135 separating the bores 134 and 138; so that fluid, i.e., prepolymer cannot flow from the port 90 to the bore 134. As a result the prepolymer feed valve 110 is held closed. It will be appreciated that the curative feed valve 106 is similarly held closed.

During the time that pressurized air is applied to the feed air control line 168, the bypass air control line 170 is free from pressure. As a result the diaphragm 150 bulges out from the annular wall 139 separating the bores 136 and 140 as a result of pressure of the fluid in the bore 138. This allows the fluid, i.e., the prepolymer, in the bore 136, which is connected to the bore 138, to pass out from the end of the bore 136 and around into the bore 140 and out through the prepolymer bypass line 98. As a result the prepolymer bypass valve 108 is opened. It will be appreciated that the curative bypass valve 104 is similarly opened.

The above described closing of the prepolymer and curative feed valves 110 and 106 prevents the flow of prepolymer and curative into the manifold 112 and the common outlet port 102 to the static mixer 28. At the same time however, the opening of the prepolymer and curative bypass valves 108 and 104 allows the prepolymer and curative to continue to flow out through their respective bypass lines 98 and 82 without becoming mixed. Also it allows the pumps 34 and 36 to continue operation at constant speed and delivery without undue back-pressure which could affect their delivery ratio.

It will be noted from FIGS. 10 and 11 that the air output port 220 is also connected to the dispensing valve assembly 30. As described above in connection with FIGS. 8 and 9 this valve assembly is held closed when pressurized air is supplied to the air cylinder 190. Thus, when the supply valves 106 and 110 are held closed and the bypass valves 104 and 108 are opened for separate recirculation of the curative and prepolymer, the dispensing valve assembly is held closed to prevent any flow of reaction mixture through or out from the static mixing device 28.

When it is desired to fill a mold, the mold is brought near the filling system and the injection nozzle 31 is positioned to direct reaction mixture into the mold as shown in FIG. 1. When this has been done the foot pedal 210 is depressed as shown in FIG. 11. This closes the switch 212 to energize the mold filling control solenoid 214 and actuate the air supply control valve 214 so that its common air input 218 is connected through the bypass control air line output 222 to the bypass control air line 170. At the same time the feed control air line 168 is freed from pressure.

It will readily be seen that this switching of pressurized air from the feed control air line 168 to the bypass control air line 170 causes both the curative and prepolymer feed valves 106 and 110 to open and their respective bypass valve 104 and 108 to close. As a result the pumps 34 and 36 drive the prepolymer and curative respectively into the manifold 112 and through its common outlet 102 so that these components are driven through and become mixed in the static mixer 28. At the same time, the dispensing valve actuation line 224 is depressurized so that the air solenoid 248 is deenergized to allow the dispensing valve 30 to open and allow flow of the reaction mixture out through the injection nozzle 31 and into the mold 30.

From time to time it becomes necessary or advisable to rid the manifold 112 and the static mixing device 28 of any solid material which may have accumulated as a result of polymerization therein of some of the reaction mixture. As shown in FIGS. 10 and 11 there is provided a 3-way valve 230 having a common output 232 connected via a cleanout line 234 to the solvent inlet feed passage 128 in the manifold 112. The valve 230 may be switched to on "OFF" position, as shown, which disconnects the cleanout line 234 from any fluid source for normal operation as above described, or it may be switched alternately to a solvent source 236 or to a pressurized air source 238.

In a cleanout operation, the valve 230 is generally first switched to the solvent source 236 to run solvent material through the cleanout line 234 and into and through the manifold 112 and the static mixer 28, to dissolve any solidified reaction mixture. After a sufficient period of time to dissolve or loosen this material, the valve 230 may be switched to the air source 238 to cause pressurized air to flow through the cleanout line 234, the manifold 112 and the static mixer 28, to blow out the foreign material and any excess solvent.

During the time that air and solvent are being driven through the manifold and the static mixer, the prepolymer and curative feed valves 110 and 106 should be closed and the prepolymer and curative bypass valves should be opened so that the prepolymer and curative will continue to recirculate without passing into the manifold or the static mixer. At the same time, however, the dispensing valve 30 should be opened to allow the solvent and air used in the cleaning operation to pass through the static mixer. In order to permit the dispensing valve to remain open under these conditions there is provided an electrical control switch 240 arranged in conjunction with the 3-way valve 230. The switch 240 is interposed between an electrical supply 242 and a solenoid energization line 244 which provides electrical power to energize the solenoid 214. Whenever the 3-way valve 230 is switched to supply either solvent or air to the manifold 112, the switch 240 is switched to disconnect the energization line 244 from the electrical supply 242. This maintains the solenoid 214 deenergized and allows the valve 218 to remain in its normal position shown in FIG. 10.

It will be noted that in the normal position of the valve 218, pressurized air is supplied via the dispensing valve actuation line 224. In order to prevent actuation of the air operated solenoid 246 and closing of the dispensing valve 30 at this time, there is interposed in the valve actuation line 224 a normally shut off override valve 246 which is held in flow communicating condition, as shown in FIG. 10, by means of an override valve control solenoid 248. The solenoid 248 is also connected to the energization line 244. Thus, whenever the 3-way valve 230 is switched to supply solvent or air to the manifold 112, the electrical control switch disconnects the electrical line 244 so that the solenoid 248 becomes deenergized and the override valve 246 reverts to a shut off condition. This allows the air operated cylinder 190 to become deenergized to open the valve 30.

It will be appreciated that the valve head assembly 24 may be modified to perform additional function simply by adding to the manifold 112 one or more subassemblies similar to the prepolymer and curative subassemblies 114 and 116. For example, where it is desired to mix a coloring material in with the curative and reaction mixture a third valve subassembly may be added along with appropriate feed and bypass lines pumping means and associated coloring material.

FIG. 12 shows a modified valve head assembly 24a with a modified manifold 112a formed with a plurality of upper surfaces 113a, 113b, 113c and 113d on three of which are mounted the valve subassemblies 114, 116 and a third subassembly 250. Appropriate connections are, of course, provided to supply fluid to and to bypass fluid from the subassembly 250; and a suitable passage (not shown) is provided through the manifold from the subassembly 250 to the common port 102.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by Letters Patent is:

1. Apparatus for filling molds with a reaction mixture, said apparatus comprising a supporting framework, an arm extending out from the supporting framework, a mixing device pivotally suspended from the outer end of said arm, reaction component conduits and bypass conduits extending from reaction component sources to said mixing device, said mixing device including mixing valve means having a reaction mixture outlet, a dispensing valve connected to said reaction mixture outlet, and a dispensing nozzle extending from said dispensing valve, said mixing valve means comprising a plurality of input ports connected to said reaction component conduits for receiving various reaction mixture components, a corresponding plurality of bypass ports connected to said bypass conduits for discharging individual reaction mixture components, said valve means being operable to switch reaction mixture flow from said conduits alternately through said reaction mixture outlet or to said separate bypass conduits; and means synchronizing said mixing valve means with said dispensing valve whereby when said dispensing valve is closed said mixing valve directs components to said bypass conduits and when said dispensing valve is open said mixing valve directs components to said reaction mixture outlet, said valve synchronizing means comprising a common pilot system constructed and arranged to operate said dispensing valve and valve assembly by applying pilot fluid pressure thereto.

2. A mechanism for filling molds according to claim 1 wherein said arm is mounted to pivot up and down on said supporting framework.

3. A mechanism for filling molds according to claim 2 wherein said arm comprises a pair of parallel members each separately pivoted to said framework structure and to a bracket connected to said mixing device whereby said bracket remains level during up and down movement of said arm.

4. A mechanism for filling molds according to claim 2 wherein said arm is maintained biased toward an upper position by means of a spring extending from said supporting framework to said arm.

5. A mechanism for filling molds according to claim 1 wherein said reaction component conduits and said bypass conduits extend along said arm.

6. A mechanism for filling molds according to claim 1 wherein said mixing device includes a mixing portion comprising an elongated conduit and a plurality of axially twisted vanes fixed inside said conduit.

7. A dispensing device for supplying a reaction mixture to a mold, said device comprising a valve assembly having a plurality of input ports for receiving various reaction mixture components, a corresponding plurality of bypass ports for discharging individual reaction mixture components and a common output port for discharging combined reaction mixture components, a dispensing valve in communication with said common output port and valve operating means arranged to operate said valve assembly and said dispensing valve in synchronism so that said valve assembly connects said input ports to said common output port when said dispensing valve is open and said valve assembly connects said input ports to their corresponding bypass ports when said dispensing valve is closed, said valve operating means comprising a common pilot system constructed and arranged to operate said dispensing valve and valve assembly by applying pilot fluid pressure thereto.

8. A dispensing device according to claim 7 wherein said valve assembly includes a first group of valves each interposed between an associated input port and its corresponding bypass port and a second group of valves each interposed between an associated input port and said common output port and means arranged to control said valves in synchronism such that the valves of the first group are opened while those of the second group are closed and vice versa.

9. A dispensing device according to claim 8 wherein said valves each close in response to application of pilot fluid pressure to control ports thereon, wherein a first pilot line is connected to the control ports of the first group of valves, a second pilot line is connected to the control ports of the second group of valves and wherein a control valve is connected to supply control fluid under pressure to said first and second pilot line alternately.

10. A dispensing device according to claim 9 wherein said dispensing valve is operative to close in response to application of pilot fluid pressure to a control port thereon and wherein said conrol port is connected to said second pilot line.

11. A dispensing device according to clim 7 wherein said valve assembly comprises a manifold having a common chamber and a plurality of outer surfaces, a valve block mounted on each of said outer surfaces, each valve block being formed with one of said input ports and a corresponding one of said output ports as well as with a manifold passageway communicating with the common chamber in said manifold, each valve block further being provided with a first valve between said input port and said bypass port and a second valve interposed between said input port and said passageway.

12. A dispensing device according to claim 11 wherein said valve blocks are each formed with first and second pairs of adjacent passageways which open out to different surface regions of each respective block, said block being formed with a separating wall separating each pair of passageways said wall having an outer surface even with the surrounding surface region of said block, flexible diaphragm on each said surface region and covering the opening of each adjacent pair of passageways at said region and means for applying pressurized pilot fluid to the surface of each diaphragm forming away from the passageways, to control communication between adjacent passageways, said input port communicating with one of the passageways of each pair, said bypass port communicating with the other passageway of one pair and said manifold passageway communicating with the other passageway of the remaining pair.

13. A dispensing device according to claim 12 wherein said adjacent passageways are in the form of concentric bores in said valve block separated by an intermediate annular wall.

14. A dispensing device according to claim 13 wherein each flexible diaphragm is sealed to said block around the outer of said concentric bores.

15. A dispensing device according to claim 14 wherein said means for applying pressurized pilot fluid includes a cap secured to said valve block and covering said flexible diaphragm, said cap being formed with a recess for allowing said diaphragm to bulge outwardly away from said separating wall and a pilot fluid connection to said recess.

16. A dispensing device according to claim 7 wherein a component mixing device is interposed between said common output and said dispensing valve.

17. Apparatus for mixing and dispensing a multiple component reactive mixture, said apparatus comprising a mixing valve assembly having a common outlet and separate inlets and outlets for each component, separate positive displacement pumps arranged to supply each of said components to an associated inlet of said mixing valve, means for driving said pumps in synchronism to maintain a precise ratio of components supplied to said valve and means for operating said valve assembly between a first state, where each separate inlet communicates with said common outlet and said separate outlets are blocked, and a second state where each separate inlet communicates with its associated separate outlet and said common outlet is blocked, said mixing valve assembly including means defining first individual passageways between each separate inlet and its corresponding outlet and means defining second individual passageways between each separate inlet and said common outlet, said operating means including a first group of valves arranged in each of said first passageways, and a second group of valves arranged in each of said second passageways, said valves being operative in response to application of pilot fluid pressure to control ports thereon, and wherein a first pilot line is connected to the control ports of said first group of valves and a second pilot line is connected to the control ports of said second group of valves.

18. Apparatus according to claim 17 wherein each pump is interposed along a supply conduit extending from a component supply to a corresponding inlet of said mixing valve and wherein a bypass conduit extends back to said component supply from a corresponding separate outlet of said valve.

19. Apparatus according to claim 17 wherein said means for driving said pumps in synchronism comprises a common drive motor and mechanical transmission means extending between the motor output and both said pumps.

20. Apparatus according to claim 19 wherein said mechanical transmission means includes a gear drive between said motor and one of said pumps to drive said one pump at a different speed than but in synchronism with the other pump.

21. Apparatus according to claim 17 wherein said valve system further includes a dispensing valve arranged in communication with said common outlet.

22. Apparatus according to claim 21 wherein said dispensing valve is operative to close in response to the application of pilot fluid pressure to a control port thereon and wherein said control port is connected to said second pilot line.

23. Apparatus according to claim 22 wherein a control valve is arranged between a source of pressurized pilot fluid and said first and second pilot lines, said control valve being operative to connect said pilot lines alternately to said source of pressurized pilot fluid.

24. Apparatus according to claim 21 wherein a mixing device is interposed between said mixing valve assembly and said dispensing valve.

25. Apparatus according to claim 24 wherein said mixing device comprises an elongated tube and a plurality of curved vanes fixed inside said tube to produce mixing of materials pumped longitudinally through the tube.

* * * * *